(12) United States Patent
Baghdasaryan

(10) Patent No.: US 8,135,377 B2
(45) Date of Patent: Mar. 13, 2012

(54) ATTACHING LOCATION DATA TO A SMS MESSAGE

(75) Inventor: Mikayel Baghdasaryan, Glendale, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 1110 days.

(21) Appl. No.: 11/965,356

(22) Filed: Dec. 27, 2007

(65) Prior Publication Data
US 2009/0170525 A1    Jul. 2, 2009

(51) Int. Cl.
*H04M 11/04* (2006.01)

(52) U.S. Cl. .................. 455/404.1; 455/404.2; 455/517; 455/521; 342/357.44; 342/357.4; 342/357.52

(58) Field of Classification Search .............. 455/404.1, 455/404.2; 342/357.44, 357.4, 357.52; 701/208–209, 213

See application file for complete search history.

(56) References Cited

U.S. PATENT DOCUMENTS

| | | | |
|---|---|---|---|
| 5,889,493 A | 3/1999 | Endo | |
| 5,904,727 A | 5/1999 | Prabhakaran | |
| 6,278,402 B1 | 8/2001 | Pippin | |
| 6,525,768 B2 | 2/2003 | Obradovich | |
| 2002/0196202 A1* | 12/2002 | Bastian et al. | 345/8 |
| 2007/0177651 A1 | 8/2007 | Daugherty et al. | |
| 2007/0277713 A1 | 12/2007 | Miresmaili | |
| 2008/0306682 A1* | 12/2008 | Dorfstatter et al. | 701/207 |

FOREIGN PATENT DOCUMENTS

| | | |
|---|---|---|
| JP | 2004198245 | 7/2004 |
| KR | 20070056227 | 6/2007 |
| WO | 02100121 | 12/2002 |

OTHER PUBLICATIONS

GPS Terminal and method for rescheduling victim using mobile communication network, published Jun. 4, 2007.*
International Patent Application No. PCT/US2008/088137, Written Opinion and International Search Report, May 29, 2009.
Transaction History of U.S. Appl. No. 09/598,538, filed Jun. 21, 2000, entitled "Method of Triggering the Transmission of Data from a Mobile Asset," now U.S. Patent Serial No. 7,142,979.
Transaction History of U.S. Appl. No. 09/692,295, filed Oct. 29, 2000, entitled "Portable Vehicle Navigation System," now abandoned.
Transaction History of U.S. Appl. No. 10/096,365, filed Mar. 12, 2002, entitled "Off-Board Navigation System With Personalized Navigation Database."
Transaction History of U.S. Appl. No. 10/115,876, filed Apr. 3, 2002, entitled "Vehicle Docking Station for Portable Handheld Computing Device."
Transaction History of U.S. Appl. No. 10/606,277, filed Jun. 23, 2003, entitled "Mounting Apparatus for Electronic Devices," now U.S. Patent Serial No. 7,088,574.
Transaction History of U.S. Appl. No. 10/812,027, filed Mar. 30, 2004, entitled "Portable Vehicle Navigation System," now U.S. Patent Serial No. 7,295,921.
Transaction History of U.S. Appl. No. 11/855,129, filed Sep. 13, 2007, entitled "Portable Vechile Navigation System."

* cited by examiner

*Primary Examiner* — Dwayne Bost
*Assistant Examiner* — Inder Mehra
(74) *Attorney, Agent, or Firm* — Winston Hsu; Scott Margo

(57) ABSTRACT

Methods and apparatus, including computer program products, for attaching location data to a SMS message. A system includes a first wireless device configured with a wireless interface operable to communicate with a wireless interface in a first personal navigation device using a Bluetooth wireless protocol, the first personal navigation device configured to attach location data to a SMS message, a second wireless device configured with a wireless interface operable to communicate with a wireless interface in a second personal navigation device using the Bluetooth wireless protocol, the second personal navigation device configured to identify location data attached to the SMS message, and a wireless network enabling communication between the first wireless device and the second wireless device.

15 Claims, 5 Drawing Sheets

ATTACHING LOCATION DATA TO A SMS MESSAGE

BACKGROUND

The present invention relates to wireless transmission, and more particularly to attaching location data to a SMS message.

In the field of mobile technology, such as cellular telephones and wireless enabled personal data assistants (PDAs), many features are available to users to enhance their experience.

One common feature on wireless mobile communications devices is Short Message Service (SMS), also referred to as text messaging. Currently, text messaging and other forms of mobile text delivery, such as wireless E-mail, are used primarily for short text communications between users.

Another common feature on wireless mobile communications devices is Bluetooth. Bluetooth wireless technology is a short-range communications technology intended to replace the cables connecting portable and/or fixed devices while maintaining high levels of security. Bluetooth is an industrial specification for wireless personal area networks (PANs). Bluetooth provides a way to connect and exchange information between devices such as mobile phones, laptops, personal computers (PCs), printers, digital cameras, and video game consoles, over a secure, globally unlicensed short-range radio frequency. Bluetooth exists in a many products, such as phones, printers, modems and headsets. The Bluetooth technology is useful when transferring information between two or more devices that are near each other in low-bandwidth situations. Bluetooth is commonly used to transfer sound data with phones (i.e. with a Bluetooth headset) or byte data with hand-held computers (transferring files).

SUMMARY

The present invention provides methods and apparatus, including computer program products, for attaching location data to a SMS message.

In general, in one aspect, the invention features a method including, in a first personal navigation device configured to wirelessly communicate with a first wireless mobile communication device, attaching location data to a Short Message Service (SMS) message along with the SMS message.

In another aspect, the invention features a system including a wireless mobile communications device configured with a wireless interface operable to communicate with a wireless interface in a personal navigation device using a Bluetooth wireless protocol, the personal navigation device configured to attach location data to a SMS message.

In another aspect, the invention features a system including a first wireless device configured with a wireless interface operable to communicate with a wireless interface in a first personal navigation device using a Bluetooth wireless protocol, the first personal navigation device configured to attach location data to a SMS message, a second wireless device configured with a wireless interface operable to communicate with a wireless interface in a second personal navigation device using the Bluetooth wireless protocol, the second personal navigation device configured to identify location data attached to the SMS message, and a wireless network enabling communication between the first wireless device and the second wireless device.

DETAILED DESCRIPTION

Figure 1:
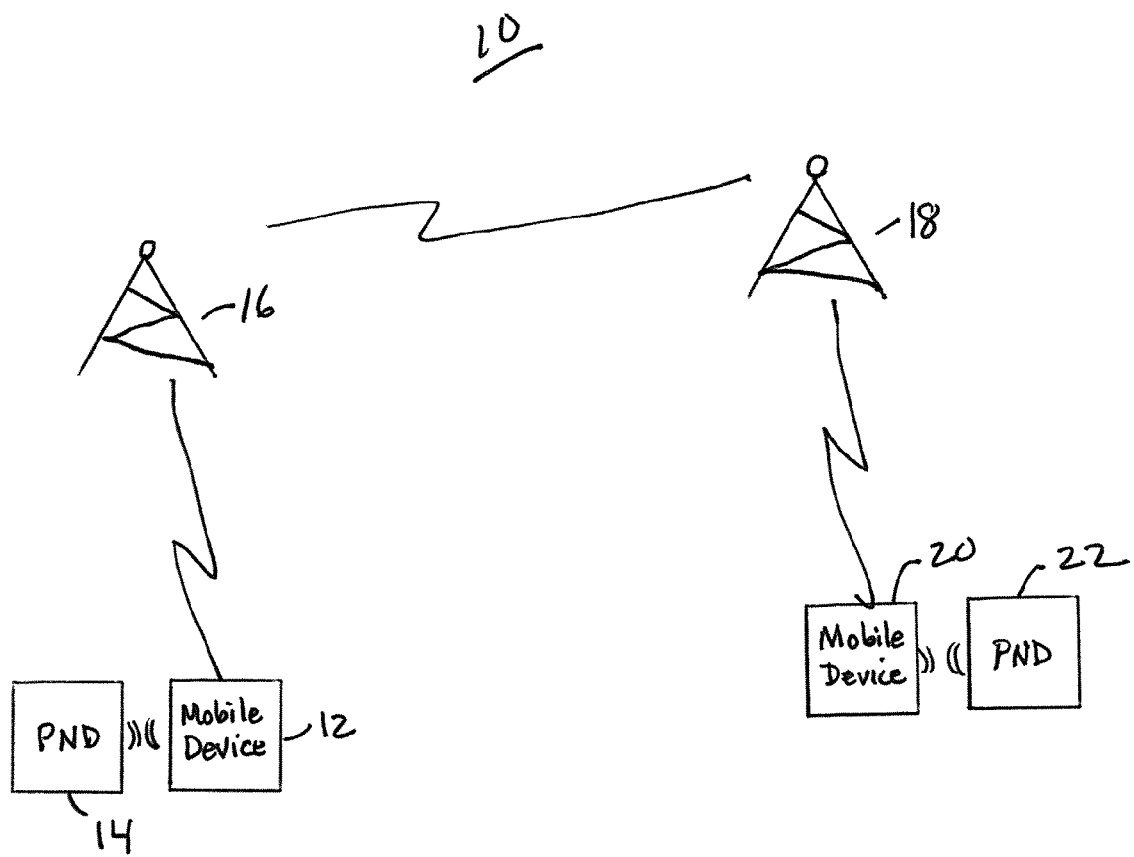
FIG. 1 is a block diagram of an exemplary network.

As shown in FIG. 1, an exemplary network 10 includes a first wireless mobile communications device 12 paired with a first personal navigation device (PND) 14. Example wireless mobile communications devices 12 include wireless phones, wireless-enabled personal data assistants (PDAs), and so forth. In general, a personal navigation device is a portable electronic device that combines a positioning capability (such as Global Positioning System (GPS)) and other navigation functions. Example portable navigation devices include the Magellan® RoadMate® 3000T, 3050T, 6000T, Magellan® Maestro 4040, and so forth, all from Magellan of Santa Clara, Calif.

First wireless mobile communications device 12 and first personal navigation device 14 are considered paired and communicate wirelessly between each other. In one particular example, both the first wireless mobile communications device 12 and the second personal navigation device 14 are Bluetooth enabled, using the Bluetooth protocol for short-range wireless communications between the first wireless mobile communications device 12 and the first personal navigation device 14.

The first wireless mobile communications device 12 communicates wirelessly with a first base station 16. In this particular example, the network 10 includes a second base station 18 that wirelessly communicates with the first base station 16 and a second wireless mobile communications device 20, which is paired with a second personal navigation device 22. In this example, both the second wireless mobile communications device 20 and the second personal navigation device 22 are Bluetooth enabled, enabling short-range wireless communications between the second wireless mobile communications device 20 and the second personal navigation device 22.

The first wireless mobile communications device 12 and the second wireless mobile communications device 20 enable two users to communicate verbally in a wireless phone communication, as well as exchange text messages using, for example, Short Message Service (SMS).

Figure 2:
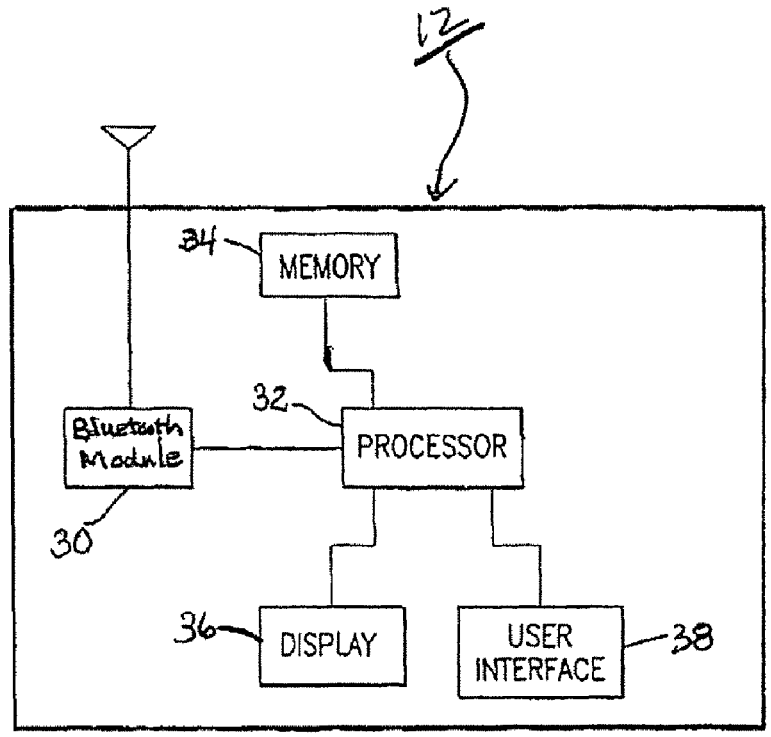
FIG. 2 is a block diagram of an exemplary wireless mobile communications device.

As shown in FIG. 2, each wireless mobile communications device, first wireless mobile communications device 12 for example, can include a Bluetooth module 30 for wirelessly transmitting and receiving information to and from a Bluetooth-enabled personal navigation device, such as first personal navigation device 14. The wireless mobile communications device 12 can include a processor 32, memory 34, display 36 and user interface (UI) 38. Each wireless mobile communication device is configured to provide Short Message Service (SMS), i.e., text messaging.

Figure 3:
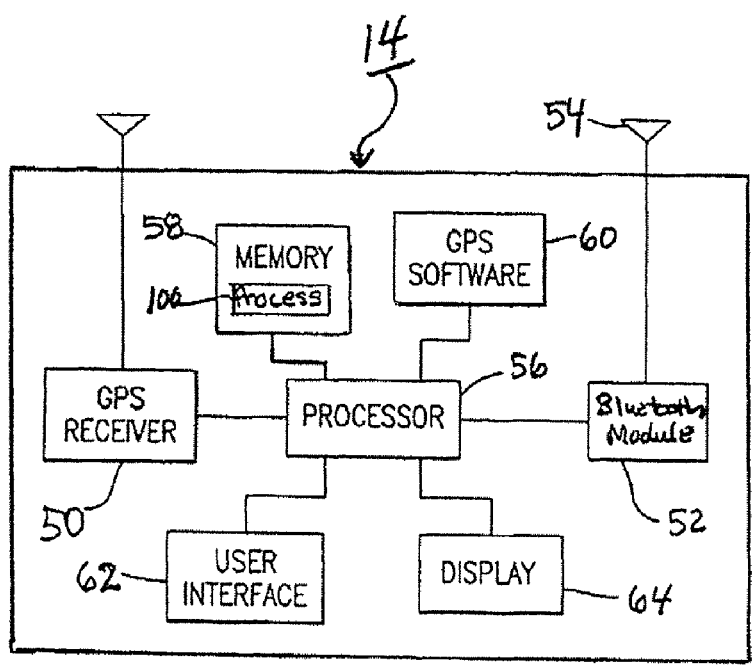
FIG. 3 is a block diagram of an exemplary personal navigation device.

As shown in FIG. 3, each personal navigation device, such as first personal navigation device 14, can include a GPS receiver 50, Bluetooth module 52, and an antenna 54. The first personal navigation device 14 can include a processor 56 and memory 58 for storing GPS software 60 operable for analyzing GPS satellite signals received by the GPS receiver 50, for determining a location of the first personal navigation device 14, and for generating location data corresponding to the calculated location. The processor 56 delivers the location data attached to a SMS message to the Bluetooth module 52 for transmission to the first wireless mobile communications device 12. Each personal navigation device is configured for text messaging (e.g., SMS).

The first personal navigation device 14 includes a user interface 62 for enabling a user to enter data, information and text message into the processor 56 and a display 64 for displaying the text message and/or calculated location of the first personal navigation device 14. The memory 58 may store cartographic map data or other useful navigational information that may be displayed on the display 64. For example, memory 58 can include a current location, a destination, previous locations, one or more addresses, one or more points of interest (POIs), an address book, and so forth.

Memory 58 includes a process 100 that attaches location data to a SMS message, i.e., process 100 enables a user to attach a location to an SMS Message along with a regular SMS message being sent. The SMS messages are transmitted via Bluetooth to a paired wireless mobile communications device, like the pairing of first wireless mobile communications device 12 with first personal navigation device 14. Process 100 enables a user to attach their current location, their destination, address book element or any other location to the SMS message they send.

Figure 4:
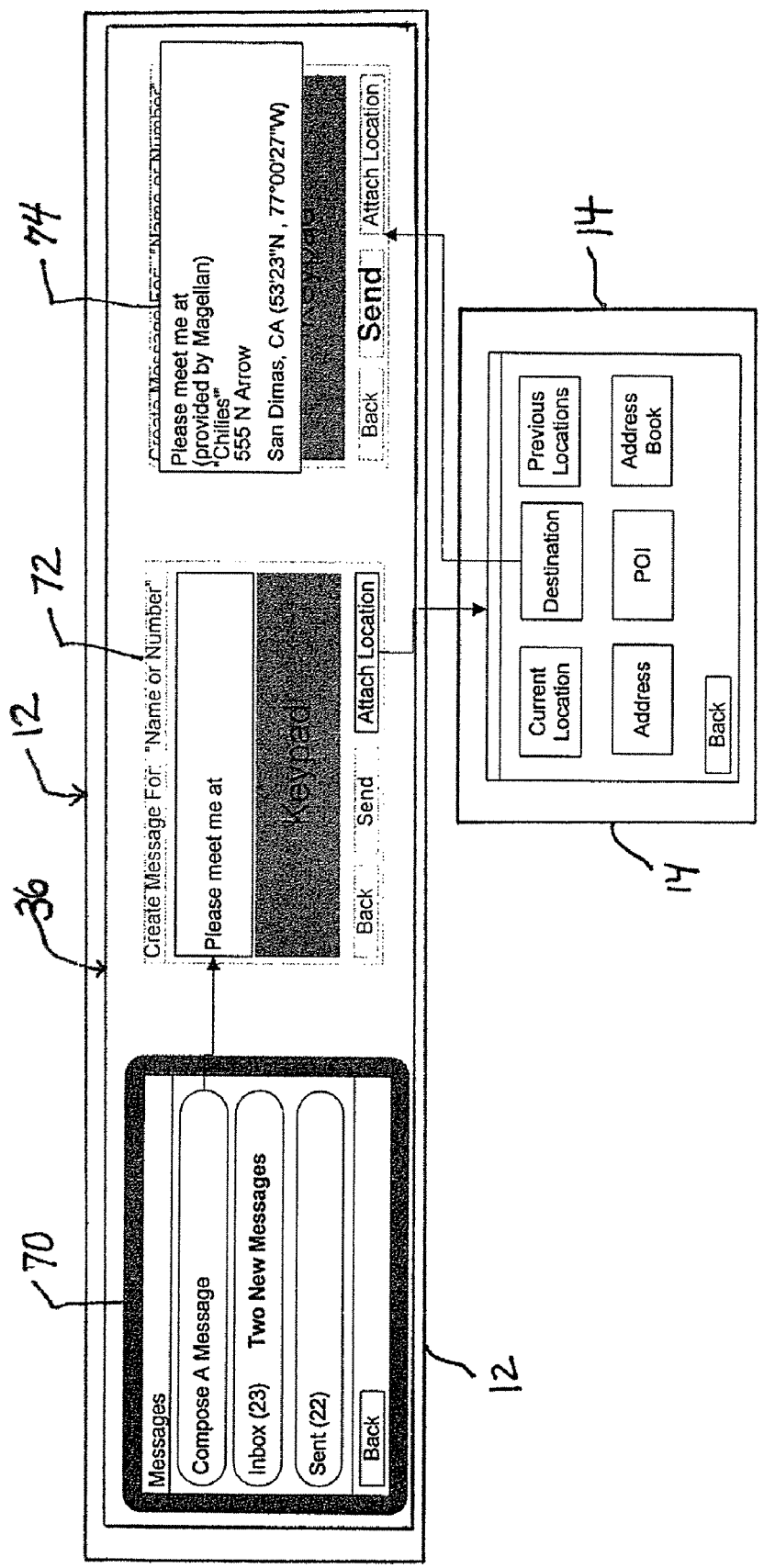
FIG. 4 is a block diagram of a series of exemplary user interfaces.

As shown in FIG. 4, an exemplary user interface (UI) 70 presented on the display 64 of the first personal navigation device 14 includes a message menu. Here, the message menu reports that there are twenty-three messages in an Inbox, two of which are new messages, and twenty-two messages in the Sent folder. The UI 70 includes an option to compose a message, and when selected, an exemplary UI 72 is displayed. In the UI 72, a sample text message is inputted, i.e., "Please meet me at," and an option to select "Attach Location" is presented.

Selecting "Attach Location" causes the first personal navigation device 14 to obtain and attach a current location of the first personal navigation device 14 to the text message under preparation. The text message and/or location data can be displayed as shown in UI 74. Should "send" be selected, the message and attachment are sent to the first wireless mobile communications device 12 and on to its intended recipient.

Figure 5:
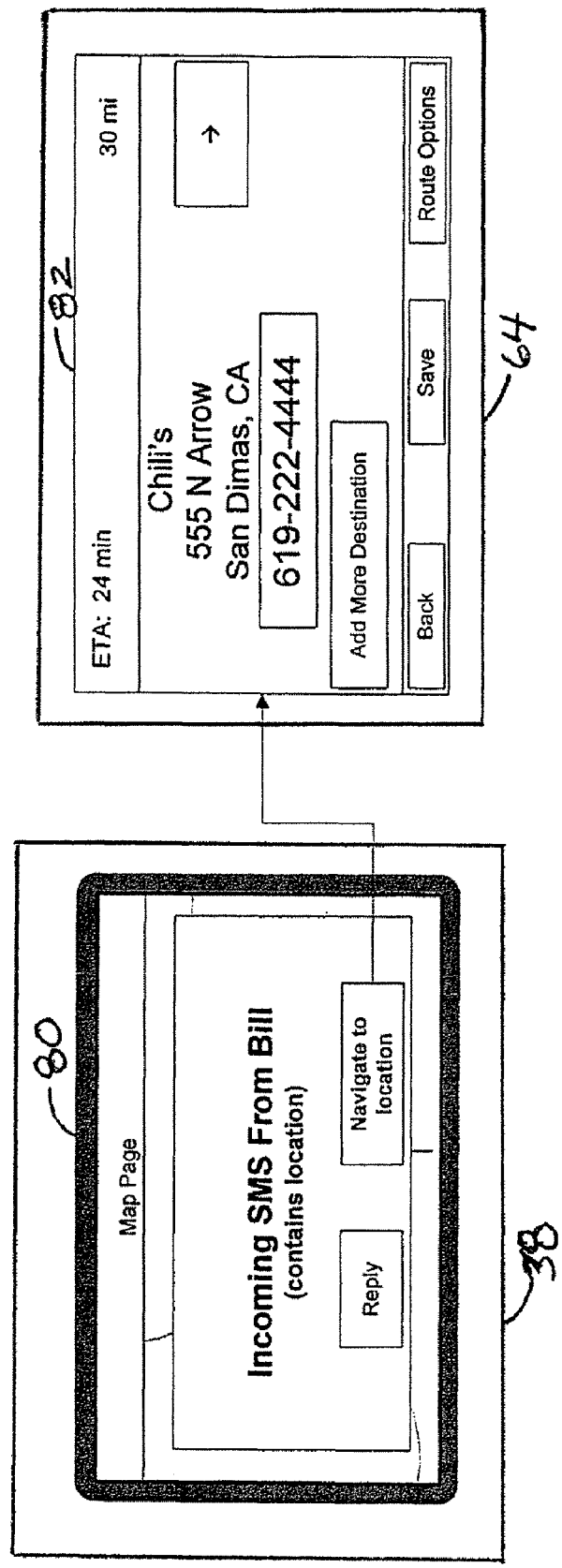
FIG. 5 is a block diagram of a series of exemplary user interfaces.

As shown in FIG. 5, if the recipient's wireless mobile communications device is paired with a personal navigation device, such as the pairing of second wireless mobile communications device 20 with second personal navigation device 22, the second personal navigation device 20 recognizes the attached location information of an incoming text message and offers to navigate to a location represented by the location data on display 64, for example, in UI 80. Should "Navigate to location" be selected, options for navigation are presented on the display 64 as, for example, UI 82.

Figure 6:
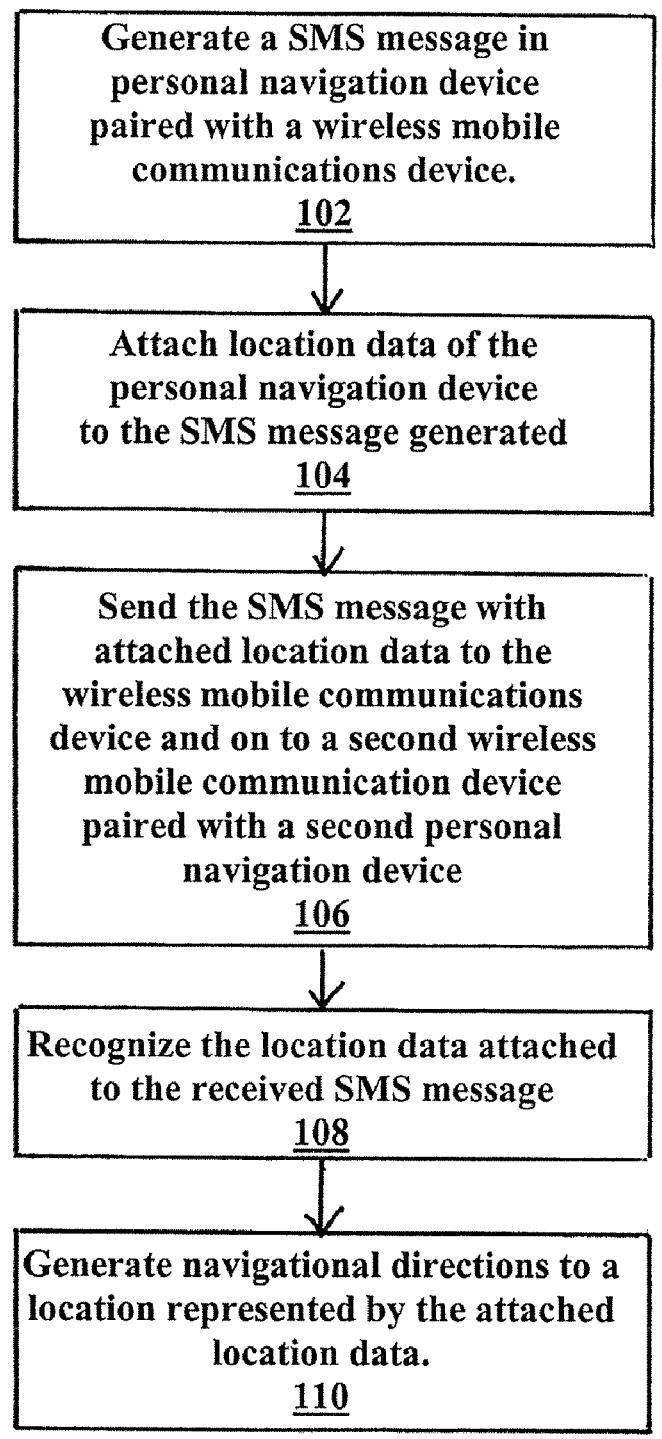
FIG. 6 is a flow diagram.
Like reference numbers and designations in the various drawings indicate like elements.

As shown in FIG. 6, process 100 includes generating (102) a SMS message in personal navigation device paired with a wireless mobile communications device. The wireless mobile communication device communicates with a wireless mobile communication device using Bluetooth technology.

Process 100 attaches (104) location data of the personal navigation device to the SMS message generated.

Process 100 sends (106) the SMS message with attached location data to the wireless mobile communications device and on to a second wireless mobile communication device paired with a second personal navigation device. The second wireless mobile communication device is configured to wirelessly communicate with the second personal navigation device using Bluetooth technology.

The second personal navigation device recognizes (108) the location data attached to the received SMS message and generates (110) navigational directions to a location represented by the attached location data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
in a first personal navigation device configured to wirelessly communicate with a first wireless mobile communication device, attaching location data to a Short Message Service (SMS) message along with the SMS message, the location data being obtained from a Global Positioning System (GPS) receiver in the first personal navigation device;
sending the SMS message with attached location data to the first wireless mobile communication device and on to a second wireless mobile communication device configured to wirelessly communicate with a second personal navigation device;

in the second personal navigation device, recognizing the location data attached to the SMS message; and in the second personal navigation device, generating navigational directions to a location represented by the attached location data.

2. The method of claim 1 wherein the first wireless mobile communication device comprises a wireless interface using a Bluetooth wireless protocol.

3. The method of claim 1 wherein the first personal navigation device comprises a wireless interface using a Bluetooth wireless protocol.

4. The method of claim 1 wherein attaching location data comprises:

generating the SMS message in the first personal navigation device; and attaching the location data to the SMS message.

5. The method of claim 1 wherein the location data includes one of a current location, a destination, a previous location, an address or point of interest.

6. A system comprising:

a first wireless mobile communications device configured with a wireless interface operable to communicate with a wireless interface in a first personal navigation device using a Bluetooth wireless protocol, the first personal navigation device configured to attach location data to a SMS message, the location data being obtained from a Global Positioning System (GPS) receiver in the first personal navigation device; and a second wireless mobile communications device configured with a wireless interface operable to communicate with a wireless interface in a second personal navigation device using the Bluetooth wireless protocol, the second personal navigation device configured to identify location data attached to the SMS message, wherein the second personal navigation device is configured to generate navigational directions to a location represented by the location data.

7. The system of claim 6 wherein the location data includes one of a current location, a destination, a previous location, an address or point of interest.

8. The system of claim 6 wherein the first wireless mobile communication device comprises:

a processor linked to the wireless interface, the wireless interface comprising a Bluetooth module for transmitting and receiving information to and from the first personal navigation device; and a memory and a user interface (UI) linked to the processor.

9. The system of claim 6 wherein the first personal navigation device comprises:

a processor linked to the wireless interface, the wireless interface comprising a Bluetooth module for transmitting and receiving information to and from the first wireless mobile communication device, the GPS receiver being linked to the processor; and a memory linked to the processor, the memory including a GPS module.

10. A system comprising:

a first wireless device configured with a wireless interface operable to communicate with a wireless interface in a first personal navigation device using a Bluetooth wireless protocol, the first personal navigation device configured to attach location data to a SMS message, the location data being obtained from a Global Positioning System (GPS) receiver in the first personal navigation device;

a second wireless device configured with a wireless interface operable to communicate with a wireless interface in a second personal navigation device using the Bluetooth wireless protocol, the second personal navigation device configured to identify location data attached to the SMS message, wherein the second personal navigation device is configured to generate navigational directions to a location represented by the location data; and a wireless network enabling communication between the first wireless device and the second wireless device.

11. The system of claim 10 wherein the location data includes one of a current location, a destination, a previous location, an address or point of interest.

12. The system of claim 10 wherein the first wireless device comprises:

a processor linked to the wireless interface, the wireless interface comprising a Bluetooth module for transmitting and receiving information to and from the first personal navigation device; and a memory and a user interface (UI) linked to the processor.

13. The system of claim 10 wherein the first personal navigation device comprises:

a processor linked to the wireless interface, the wireless interface comprising a Bluetooth module for transmitting and receiving information to and from the first wireless device, the GPS receiver being linked to the processor; and a memory linked to the processor, the memory including a GPS module.

14. The system of claim 10 wherein the second wireless device comprises:

a processor linked to the wireless interface, the wireless interface comprising a Bluetooth module for transmitting and receiving information to and from the second personal navigation device; and a memory and a user interface (UI) linked to the processor.

15. The system of claim 10 wherein the second personal navigation device comprises:

a processor linked to the wireless interface, the wireless interface comprising a Bluetooth module for transmitting and receiving information to and from the second wireless device;

a Global Positioning System (GPS) receiver linked to the processor; and a memory linked to the processor, the memory including a GPS module.

* * * * *